US007113572B2

(12) United States Patent
Holmes (10) Patent No.: US 7,113,572 B2
(45) Date of Patent: Sep. 26, 2006

(54) SYSTEM AND METHOD FOR RECOGNITION OF AND AUTOMATIC CONNECTION USING SPOKEN ADDRESS INFORMATION RECEIVED IN VOICE MAILS AND LIVE TELEPHONE CONVERSATIONS

(75) Inventor: David William James Holmes, Sammamish, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 272 days.

(21) Appl. No.: 09/972,572

(22) Filed: Oct. 3, 2001

(65) Prior Publication Data

US 2003/0063717 A1    Apr. 3, 2003

(51) Int. Cl.
*H04M 11/08* (2006.01)
*H04Q 7/38* (2006.01)

(52) U.S. Cl. .................................. 379/88.14; 455/414.4
(58) Field of Classification Search ............. 379/88.01, 379/88.03, 88.18, 88.04; 704/276, 206; 370/352; 455/563
See application file for complete search history.

(56) References Cited

U.S. PATENT DOCUMENTS

| 5,303,299 | A | * | 4/1994 | Hunt et al. ............... 379/88.01 |
| 5,325,421 | A | | 6/1994 | Hou et al. |
| 5,638,436 | A | | 6/1997 | Hamilton et al. |
| 5,652,789 | A | * | 7/1997 | Miner et al. ........... 379/201.01 |
| 5,848,130 | A | * | 12/1998 | Rochkind ................ 379/88.01 |
| 5,857,013 | A | | 1/1999 | Yue et al. |
| 6,073,103 | A | * | 6/2000 | Dunn et al. .................. 704/276 |
| 6,088,428 | A | | 7/2000 | Trandal et al. |
| 6,249,765 | B1 | * | 6/2001 | Adler et al. ................ 704/500 |
| 6,282,268 | B1 | | 8/2001 | Hughes et al. |
| 6,314,166 | B1 | * | 11/2001 | Laurila et al. ........... 379/88.03 |
| 6,400,806 | B1 | | 6/2002 | Uppaluru |
| 6,501,966 | B1 | | 12/2002 | Bareis et al. |
| 6,526,292 | B1 | * | 2/2003 | Henry, Jr. ................. 379/88.03 |
| 6,539,359 | B1 | | 3/2003 | Ladd et al. |
| 6,553,024 | B1 | * | 4/2003 | Hunlich et al. ............. 370/352 |
| 6,570,964 | B1 | * | 5/2003 | Murveit et al. ............ 379/67.1 |
| 6,601,031 | B1 | | 7/2003 | O'Brien |
| 2002/0090066 | A1 | | 7/2002 | Gupta et al. |
| 2003/0021394 | A1 | | 1/2003 | Krack |
| 2003/0026392 | A1 | * | 2/2003 | Brown et al. ............ 379/88.13 |
| 2003/0190020 | A1 | * | 10/2003 | Kitchings ................ 379/88.01 |

FOREIGN PATENT DOCUMENTS

| EP | 1 107 546 A2 | 6/2001 |
| WO | WO99/45687 A1 | 9/1999 |
| WO | WO99/45691 A1 | 9/1999 |

OTHER PUBLICATIONS

Agraharam et al., Voice Messaging System For Converting Oral Messages Into Text Messages, Apr. 1, 2004.*

* cited by examiner

*Primary Examiner*—Gerald Gauthier
(74) *Attorney, Agent, or Firm*—Woodcock Washburn LLP (57) ABSTRACT

A system and method are provided for automatically providing for connection to electronic addresses received in spoken communications or audio signals. Under one embodiment, a system and method receives telephone calls or other information streams including spoken address information. The spoken address information includes electronic addresses, for example, telephone numbers. The system and method identify the spoken address information, and automatically recognize and extract the identified address information from the information stream. The extracted address information is subsequently available for use in automatically coupling a receiving communication device to electronic devices accessed by or associated with the extracted address information.

17 Claims, 7 Drawing Sheets

SYSTEM AND METHOD FOR RECOGNITION OF AND AUTOMATIC CONNECTION USING SPOKEN ADDRESS INFORMATION RECEIVED IN VOICE MAILS AND LIVE TELEPHONE CONVERSATIONS

TECHNICAL FIELD

The following disclosure relates generally to communication systems and, in particular, to communication systems using voice recognition technology.

BACKGROUND

The popularity and availability of portable communication devices has undergone a significant increase as a result of technological gains that have provided more efficient, reliable and cost-effective mobile devices. As these devices have become more capable and cheaper to own, they have become an integral part of everyday life. Thus, now, more than ever, more people rely on these devices to communicate with their families, friends, co-workers, and business associates while on the go. Further, many of these devices are capable of gathering and presenting many types of information and connecting with other types of electronic devices, thereby allowing users to integrate them into all aspects of their lives.

As these portable communication devices become more integrated into society and daily routines, they are relied on more, and more is expected of them. So much so, that portable communication devices are often used as the sole means of communication. For example, people have cellular telephone conversations while driving to work, and while walking on the beach. Further, one can check his voice mail using a personal computer while waiting in an airline terminal.

As a result of the increased numbers of these communication devices in use, and the safety risks inherent in the use of these devices during certain activities, there has been a trend to enhance services available through these devices. This trend has been to incorporate automated call processing techniques into communication systems and system services. Many typical message paging and cellular telephone systems, for example, include interfaces that enable callers to leave numeric messages using a telephone keypad, which are automatically transmitted to the system subscriber. More advanced systems enable callers to interact with the system using a computer network and thereby type text messages into their computer for transmission to a mobile device like a text message pager or cellular telephone. In these typical systems the system subscriber can read and even store the received text messages. However, there is a desire to increase the utility and automation of these call and message processing systems.

In the drawings, the same reference numbers identify identical or substantially similar elements or acts. To easily identify the discussion of any particular element or act, the most significant digit or digits in a reference number refer to the Figure number in which that element is first introduced (e.g., element 104 is first introduced and discussed with respect to FIG. 1).

Any headings provided herein are for convenience only and do not necessarily affect the scope or meaning of the claimed invention.

DETAILED DESCRIPTION OF THE ILLUSTRATED EMBODIMENTS

A spoken address recognition/connection system, and in particular, a system and corresponding method for automatically connecting to electronic addresses received in spoken or oral communications, is described in detail herein. The spoken address recognition/connection system, or "recognition/connection system" as it is generally referred to herein, allows users to configure their telephone systems, for example, to automatically recognize spoken address information of live conversations and pre-recorded messages. The recognized address information is used to automatically connect the users with telephones or other communication devices associated with the address information. As such, users can function more efficiently and safely by using their communication devices to automatically manipulate message information even when it is not convenient or possible to manually copy this information.

In the following description, numerous specific details are provided, such as specific data flows, specific methods of analyzing and processing speech information, etc. to provide a thorough understanding of, and enabling description for, embodiments of the invention. One skilled in the relevant art, however, will recognize that the invention can be practiced without one or more of the specific details, or with other symbols, methods, etc. In other instances, well-known structures or operations are not shown, or are not described in detail, to avoid obscuring aspects of the invention.

In general, alternatives and alternative embodiments described herein are substantially similar to previously described embodiments, and common elements and acts or steps are identified by the same reference numbers. Only significant differences in construction or operation are described in detail.

Unless described otherwise below, the construction and operation of the various blocks shown in the referenced figures are of conventional design. As a result, such blocks need not be described in further detail herein, because they will be understood by those skilled in the relevant art. Such further detail is omitted for brevity and so as not to obscure the detailed description of the invention. Any modifications necessary to the blocks of any embodiments can be readily made by one skilled in the relevant art based on the detailed description provided herein.

Figure 1:
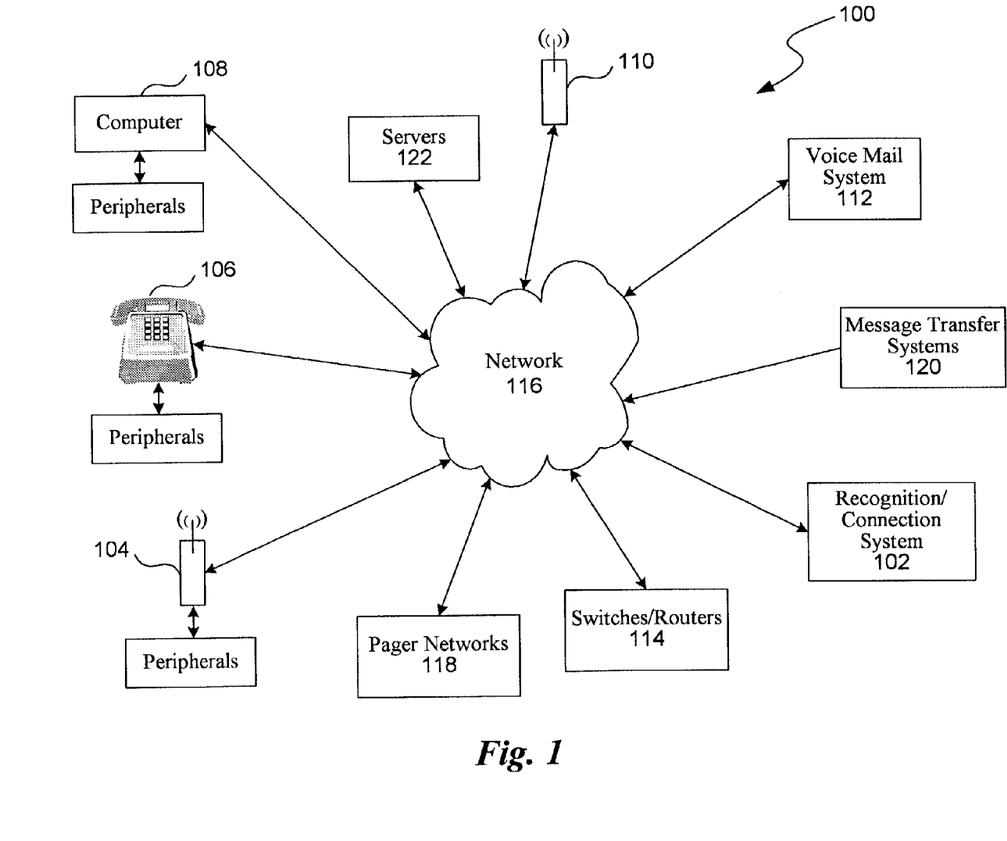
FIG. 1 is a block diagram of a communications system having a spoken address recognition/connection system, or recognition/connection system, under one embodiment.

FIG. 1 is a block diagram of a communications system 100 having a spoken address recognition/connection system 102, or recognition/connection system, under one embodiment. The recognition/connection system 102 is coupled, via networks 116, to communication devices 104–110 and voice mail or message systems 112, switching and routing systems 114, associated networks 116 including switching and routing systems, and servers 122, in numerous combinations. The recognition/connection system 102 can also be coupled to pager networks/systems 118 including one-way and two-way pager systems. Further, the recognition/connection system 102 can be coupled to message transfer systems/networks 120 including message service servers.

The communication devices 104–110 include, but are not limited to electronic communication devices, wireless telephones, wired telephones, cellular telephones, wired radiotelephones, wireless radiotelephones, Internet or other network-based telephones, telephone peripheral devices, personal computers and peripheral devices, smart cards, personal digital assistants, telematic and infomatic systems including vehicle telematic systems, and other communication devices supporting data streams including voice data. The device peripherals include speakerphones, personal computers, personal digital assistants, processor-based devices, automatic dialers, directories, databases, and any other peripherals that are supported by a telephone- or processor-based system. The term "processor" as generally used herein refers to any logic processing unit, such as one or more central processing units (CPUs), digital signal processors (DSPs), application-specific integrated circuits (ASIC), etc. While many functions described herein are shown as separate functional blocks, some or all of these functions are realized using one or more processors, and can be realized with hardware, firmware, software, or any combination thereof.

The various functions of any of the spoken address recognition/connection system embodiments described herein can be performed separately or distributed among any combination of system and/or associated network components.

The recognition/connection system 102 receives voice stream data including live incoming calls from communication devices 104–110 and voice mail messages from a voice mail system 112. The recognition/connection system 102 applies voice recognition technology to the voice stream data to identify, recognize, and extract address information from the voice stream data. The address information includes telephone numbers, Uniform Resource Identifiers ("URIs"), and electronic mail ("email") addresses, but is not so limited.

The extracted address information is provided to users at electronic devices 104–110 or electronic addresses of their choosing using numerous transfer methods. In one embodiment, the user configures the recognition/connection system to provide the extracted address information to particular types and numbers of devices at particular electronic addresses. For example, the user can configure the recognition/connection system to transfer the address information to any number of communication devices having any number of electronic addresses. Therefore, the address information might be provided to personal cellular telephones, business cellular telephones, personal email addresses, business email addresses, text messaging devices, pagers, personal web pages, and corporate web pages, each separate or in any combination. Thus, the extracted address information is formatted accordingly to support any of a number of automatic call-back or connection options using the extracted address information for the particular devices specified.

A user configures the recognition/connection system as needed using any number or combination of user interfaces or interface techniques hosted on or supported by the communication devices 104–110 and/or the networks 116. For example, configuration occurs using graphical user interfaces hosted on portable communication devices which provide menu-driven configuration using keyed inputs or spoken commands. Also, call-up menu systems support configuration by allowing users to call in on their portable telephones and respond to voice prompts for configuration options using keyed inputs or spoken commands. Other configuration options include using graphical user interfaces hosted on personal computers or personal digital assistants which support menu-driven configuration options via manual and/or spoken commands. Still another configuration technique involves browsers hosted on client computers which support configuration using specific templates or web pages via manual and/or spoken commands.

Configuration options are also supported in which different destination devices are pre-programmed throughout a particular time period as a user's access to destination devices changes. For example, a user configures the recognition/connection system to provide extracted address information to her business cellular telephone between 7:00 a.m. and 11:30 a.m. because she plans to be in meetings during that period. The address information is then provided to her personal cellular telephone between 11:30 a.m. and 12:30 p.m. because she plans to be at lunch with a friend during that period. After 12:30 p.m. she routes the address information to her work email address because she plans to be at her desk during this period, and she will use the extracted information to return the telephone calls from her personal computer.

In supplying extracted information to different types and numbers of destination electronic devices, extracted address information can be included in electronic mail messages of various formats. The message format is compatible with the particular destination device. So, for example, an extracted telephone number destined for a portable telephone is transferred in one message using a format compatible with the telephone service in which it is to be used, while the same extracted number destined for a computer is transferred in another message using an email format compatible with the network over which it is to be transmitted. In an embodiment, the message formatting is performed automatically by the recognition/connection system based, at least in part, on information about the destination device. The message formatting in alternate embodiments is performed using information gathered from a subscriber through the configuration interface. Any message formatting information peculiar to a device type, for example device access/security information or protocol information, could be provided using the configuration interface. Upon receipt at the respective electronic devices, the address information is extracted from the transfer message and made available to the user.

Regarding use of the extracted address information by a cellular telephone, for example, the user selects his cellular or portable telephone to receive the extracted address information. Upon receipt at the cellular telephone, the user can depress the "*" button or any other designated keypad button and the system will retrieve the address information, a telephone number in this example, and make a call for the user based on that address. Alternatively, the system may automatically provide control signals to the user's phone to store the extracted address in memory of the phone. By pressing the "*" button, the user may then command the phone to retrieve the locally stored address and make a call. The phone may also be commanded verbally.

Further examples include, but are not limited to, the user selecting one of the following to receive the extracted address information: an automatic dialer coupled to a wired or wireless telephone; an electronic telephone directory of a personal computer or personal digital assistant into which the address information is to be stored; and a portable electronic device coupled to receive the address information via a vehicle telematic system. Moreover, a user might select his cellular telephone and his personal computer to receive the extracted address information; at the cellular telephone he uses the information to place a call, and at the personal computer he uploads the information into an electronic directory or database. Also, conference calls are facilitated when a user provides the extracted information to numerous participants in a conference call, thereby allowing each recipient of the extracted information to connect to a common conferencing number.

When the extracted address information is a URI or email address, a user might have the extracted address information transferred to a web-enabled personal computer or set top box where it is used to connect to the corresponding web site or address. Also, an extracted URI or email address might be transferred to web-enabled cellular telephones or personal digital assistants.

These connection options are especially helpful for portable, cellular, and speaker telephone users that are often in situations where it is not convenient or even possible to divert their attention from another task or to manually copy down address information. As an example, vehicle operators using a cellular telephone or vehicle telematic system would find this system particularly useful because they can not safely or easily copy down address information or manipulate text message information.

The networks 116 and network couplings of an embodiment include any combination of wired or wireless communications supported across any combination of wide area, metropolitan area, and local area network environments. The associated telephone networks include cellular telephone networks, Public Switched Telephone Networks (PSTNs), data networks, and voice over data networks including voice over Internet Protocol (V0IP) and voice over Frame Relay (VoFR).

The recognition/connection system 102 functions can be resident on dedicated network appliances, the communication devices 104–110, the voice mail system 112, the switches/routers 114, components of the network 116, or distributed among any combination of these devices. For example, the recognition/connection system can reside on a user's cellular telephone or telephone peripheral, portable computer or computer peripheral. Further, the recognition/connection system can be hosted as a component of a voice mail system or an office server system. The recognition/connection system functionality can also reside on network components including routers, switches, and end-user devices. In vehicle telematic applications the system can be hosted by the telematic servers, vehicle telematic platform, or any number of automobile peripherals or peripheral electronic devices coupled to the vehicle telematic platform.

Figure 2:
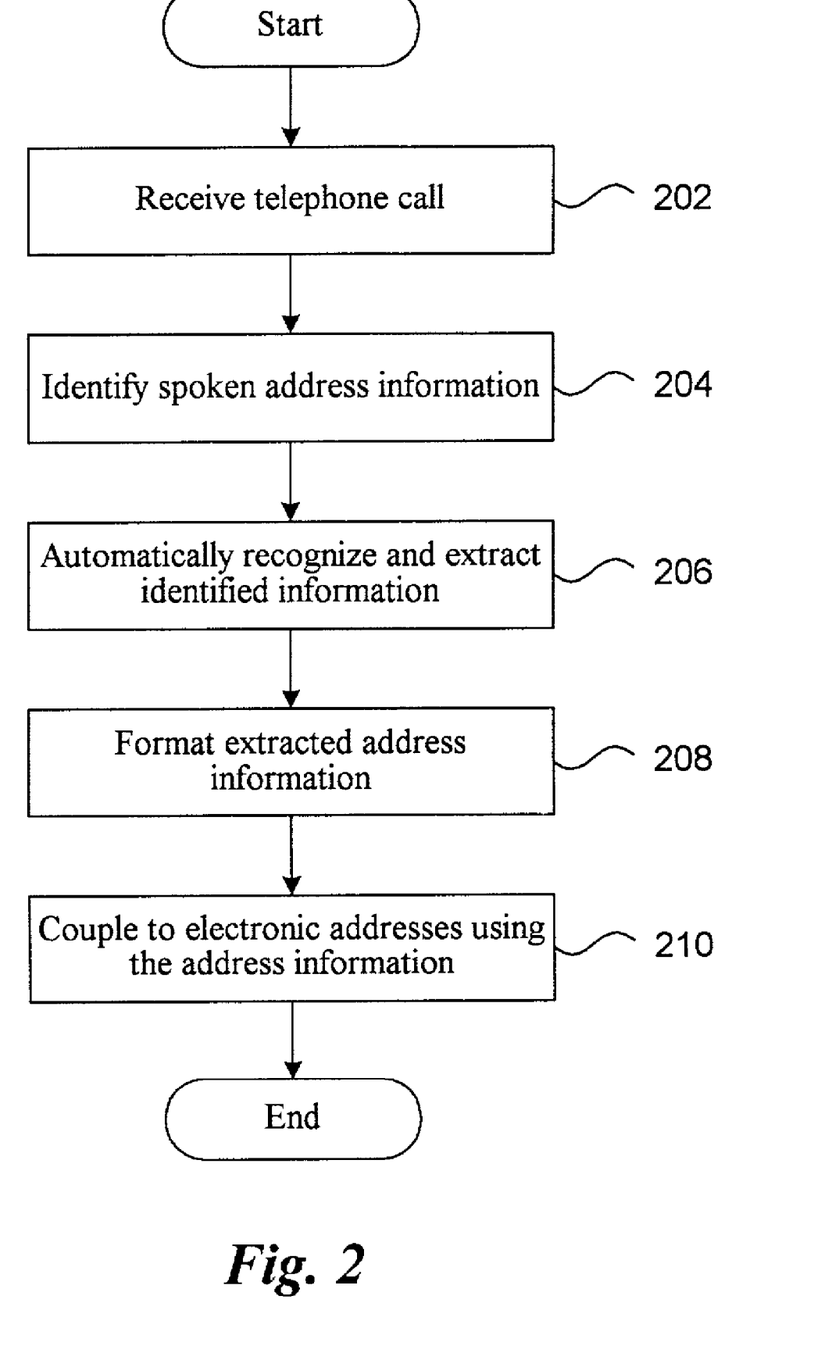
FIG. 2 is a flow diagram of a spoken address recognition/connection system of the embodiment of FIG. 1.

FIG. 2 is a flow diagram of functionality performed by the spoken address recognition/connection system 102. In operation, the system 102 receives information streams including telephone calls in block 202. The information streams include digital and analog voice (or audio) communications, and may include other data or communication types. The voice communications include oral or voiced address information. The system 102 identifies the voiced address information in block 204, and a voice recognition system, subroutine, or algorithm in block 206 automatically recognizes and extracts the raw identified information. Systems and software for performing voice recognition are well-known to those skilled in the relevant art. Any necessary modifications to such systems or software are described in detail herein. The identification, recognition, and extraction can be applied to a live conversation or information session, or a previously recorded conversation or session, for example, a voice mail recording, as described more fully below. Under block 208, the raw information is placed in a pre-specified format compatible with a user's selected delivery options, and made available to the user. The user can automatically couple to electronic devices associated with the extracted electronic addresses using the extracted address information under block 210, as described below.

The recognition/connection system 102 provides automatic recognition of address information and connection to electronic devices using the address information, with numerous user-selectable configurations including real-time recognition and extraction of address information from live conversations as well as recognition and extraction from previously recorded messages. Both of these configurations are now described in FIGS. 3 and 4, respectively.

Figure 3:
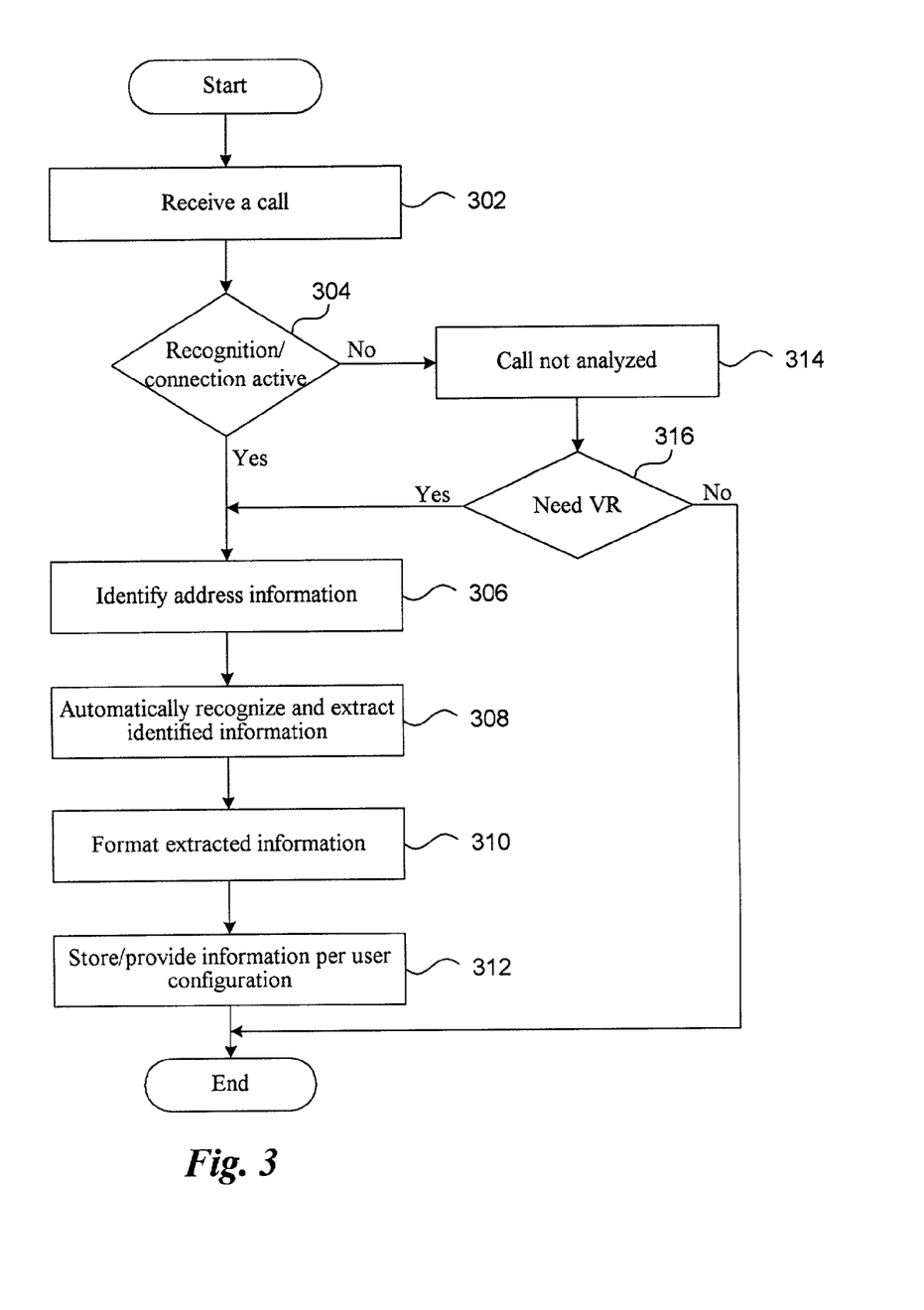
FIG. 3 is a flow diagram of real-time recognition and extraction in a spoken address recognition/connection system of the embodiment.

FIG. 3 is a flow diagram of real-time recognition and extraction in a spoken address recognition/connection system of the embodiment. An incoming call is received from a calling party directed or addressed to a user, or called party under block 302. When the recognition/connection system is activated under block 304, the call is provided to the recognition/connection system. Activation occurs using manual or verbal commands, or any combination thereof, but is not so limited. Address information is identified under block 306, and the identified address information is automatically recognized and extracted in block 308. The extracted address information is formatted under block 310 in a pre-specified form as described herein. The formatted address information is available to the user at any time. In one embodiment, the address information is stored at a user-selected location for later retrieval by the user under block 312. The address information is subsequently available for use in automatically coupling the user's communication device to electronic devices accessed by or associated with the extracted address information.

As discussed herein, the recognition/connection system may not be active at the time the call is received under block 304. An incoming call is not analyzed when the recognition/connection system is not active under block 314. However, the user may activate the system under block 316 during a live telephone conversation at such time as the user wants to extract address information. For example, the user may be able to depress the "#" button on her cell phone to activate the system 102. Therefore, the system 102 analyzes an ongoing voice call to recognize the user's "#" button selection to activate the recognition/connection functionality described herein.

Numerous alternatives are available for providing a live call to the user and the recognition/connection system. In one routing scenario, the call flow is coupled from the calling party to the user via the recognition/connection system. In another scenario, the call is coupled from the calling party to both the user and the recognition/connection system using separate coupling paths. In yet another scenario, the call is first routed to the user and then subsequently re-routed via the recognition/connection system.

Figure 4:
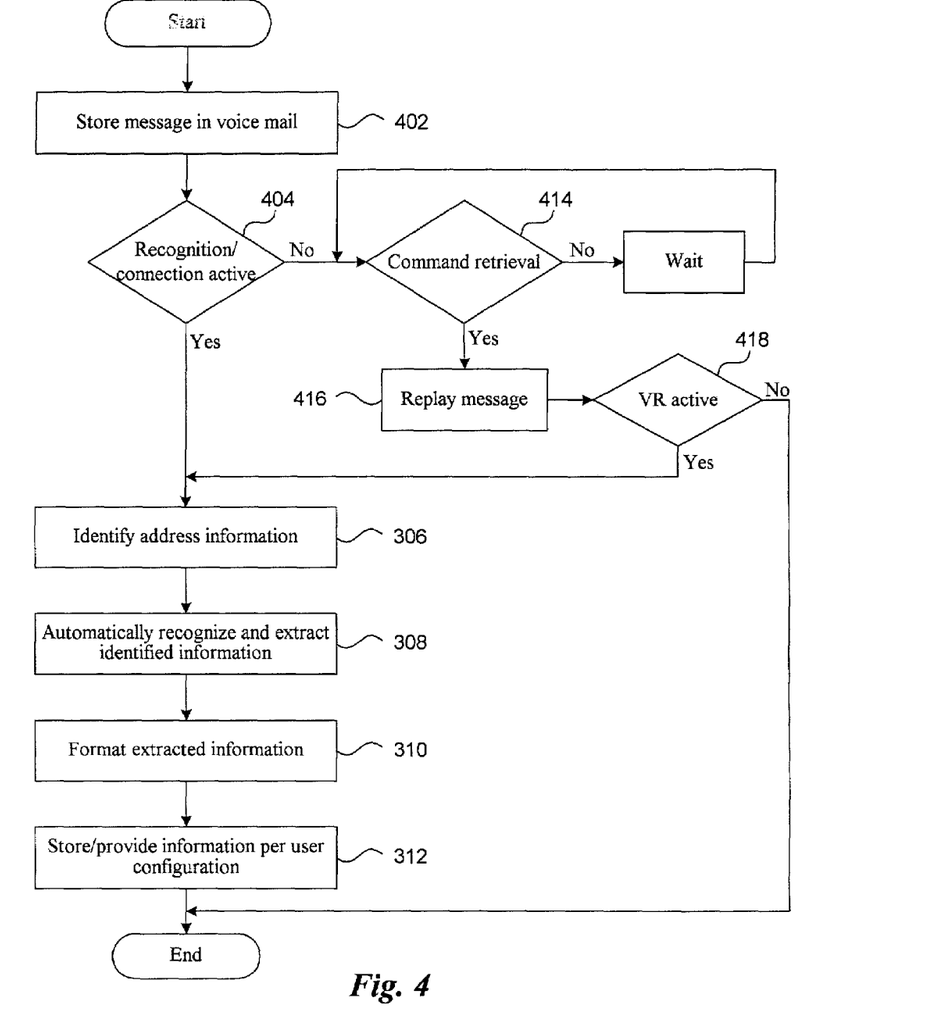
FIG. 4 is a flow diagram of recognition and extraction from previously recorded messages in a spoken address recognition/connection system of the embodiment.

FIG. 4 is a flow diagram of address recognition and extraction from previously recorded messages in an alternative spoken address recognition/connection embodiment. This alternative recognition/connection system and associated voice mail system(s) support numerous configurations. These configurations include automatically identifying and extracting address information from calls either as messages are recorded, or following recording where messages are later retrieved and analyzed.

When configured to automatically identify and extract address information from calls as messages are received, an incoming call is directed to a voice mail system or box for storage under block 402. When the recognition/connection system is active under block 404, the voice stream is provided to the recognition/connection system as it is being stored. Alternative embodiments transfer the message contents to the recognition/connection system following recording. In both embodiments, the recognition/connection system identifies address information under block 306, and automatically recognizes and extracts identified information in block 308. Formatting of extracted address information under block 310 occurs as described herein. The formatted address information is available to the user at any time for use in automatically coupling the user's communication device to electronic devices accessed by or associated with the extracted address information 312.

When configured to store messages for later retrieval/analysis, the recognition/connection system is inactive and the call is simply received and stored as a message in the voice mail system. Upon receiving commands for message retrieval under block 414, the system 102 commences playback of the stored message in block 416. The user can activate the recognition/connection system anytime during message playback under block 418 (such as by depressing an appropriate key). Upon activation, the recognition/connection system analyzes the message contents as described herein.

Figure 5:
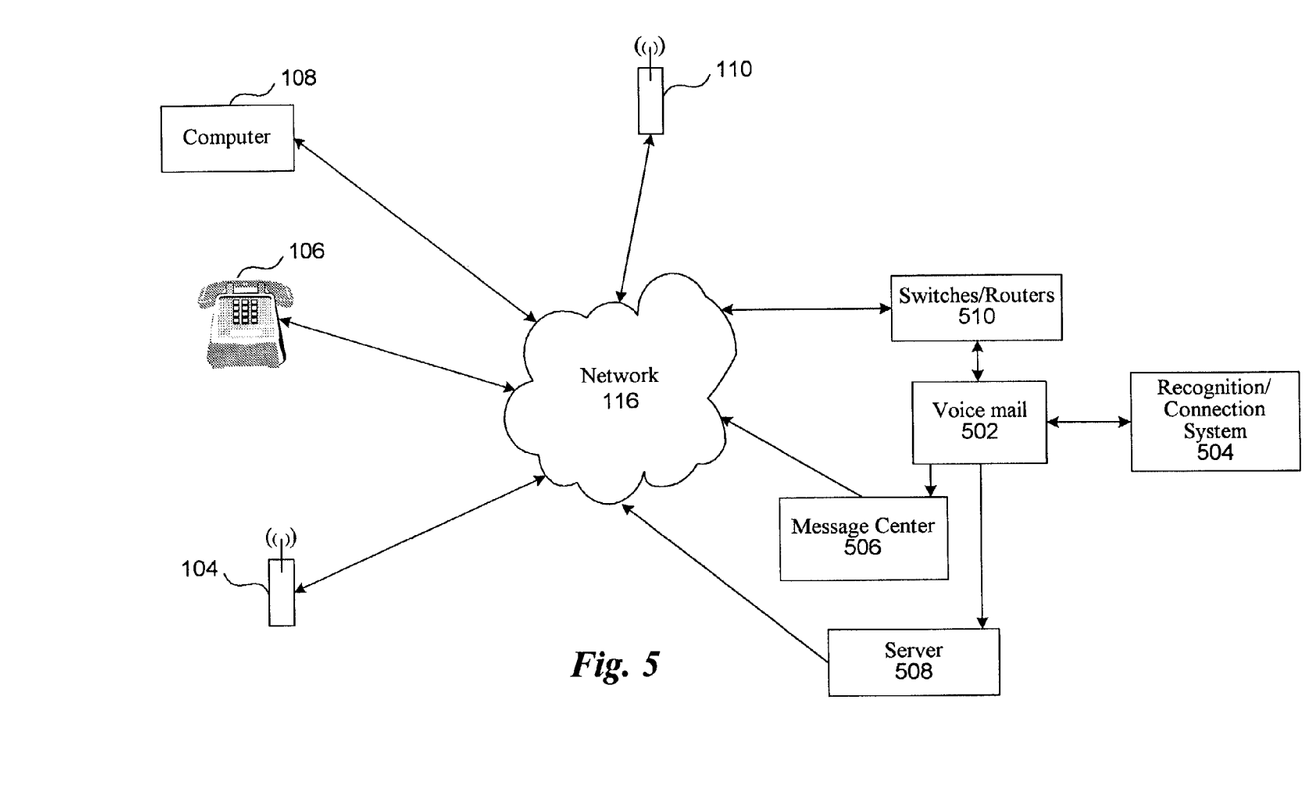
FIG. 5 is an alternate configuration for a communications network including a spoken address recognition/connection system of an embodiment.

FIG. 5 is a communications network including a spoken address recognition/connection system under an alternative embodiment. This configuration includes a voice mail box 502 or system coupled among a recognition/connection system 504, a message center 506, a server 508, a switching/routing system 510, network components 116, and communication devices 104–110. The recognition/connection functions can be hosted on or distributed among any combination of these components 104–116 and 502–510. The couplings among these devices can be any combination of wired or wireless communications supported across any combination of wide-area, metropolitan area, or local area network environments. The associated telephone networks include cellular telephone networks, Public Switched Telephone Networks (PSTNs), and voice over data networks, but are not so limited.

Figure 6:
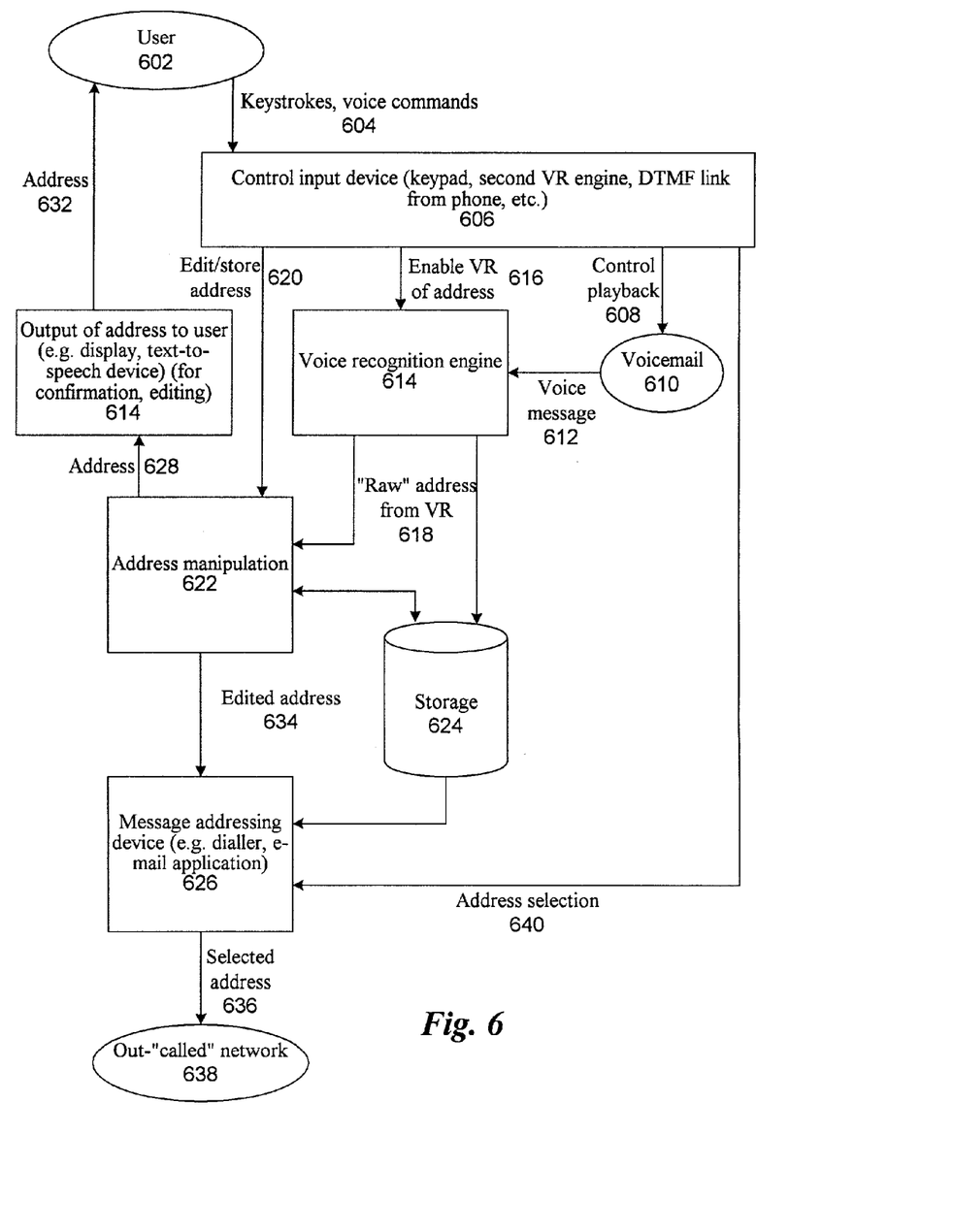
FIG. 6 is a functional block diagram of a spoken address recognition/connection system of the alternate embodiment.

FIG. 6 is a functional block diagram of a spoken address recognition/connection system of this alternate embodiment. With reference to FIGS. 5 and 6, the spoken address recognition/connection system accepts inputs 604 from users 602 reviewing voice mail messages. The inputs 604, including keystrokes on a phone or computing device, are received via a control input device 606. The control input device 606 may include commands to an input voice recognition (VR) unit that receives user voice commands. The user 602 can control playback 608 of a voice mail 610 so that the voice message 612 is provided to or analyzed by a voice recognition engine 614. When a user 602 hears address information in a replaying message that can be used to contact another electronic device, the user 602 commands the system 616 to activate the recognition/connection system or engine 614 and analyze or scan the message 612 for address information.

When the voice recognition engine 614 detects address information it identifies the portion of the message that includes the address information and manipulates the voice mail system 610 to re-play the identified passage to the user 602 for confirmation. The voice recognition engine 614 can be configured to identify the longest message string that could be an address, because it may be more efficient to edit the identified message string at the user's phone, but is not so limited.

During or following output or replay of identified passages, the user 602 can confirm that the identified passages include address information for retrieval, and command the system 604 to extract the raw address information 618 from the voice message 612. The user 602 can also control 620 manipulation and editing 622 of the raw address information 618. The address manipulation may be configured to automatically occur using pre-specified instructions or rules, or may be done manually by the user at the time of message retrieval. The manipulation includes, but is not limited to, storing the raw address in a database 624, encoding the raw address information using a message addressing device 626, and outputting the address 628 to a display or text-to-speech device 630, for example, for presentation 632 to the user 602.

The edited address 634 is, as described herein, provided to a message addressing device 626 where it is encoded in any of a number of data streams corresponding to any number of formats or protocols appropriate for the system or device to which the user 602 wants to be coupled. The user 602 of an embodiment can make an electronic address selection 640 or input an address using the control input device 606. The generated message including the selected address is subsequently used to connect 636 with another electronic device or network 638.

Figure 7:
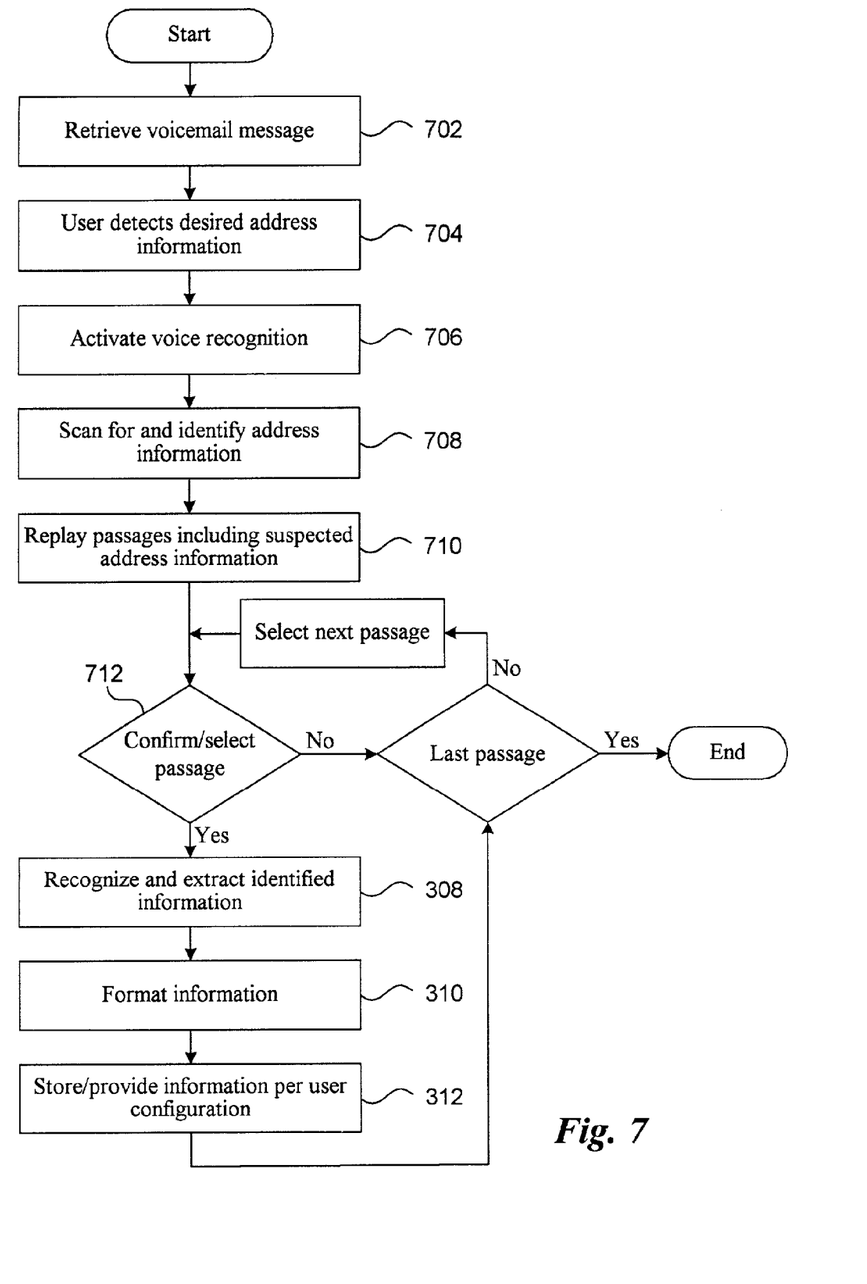
FIG. 7 is a flow diagram of recognition and extraction from previously recorded messages in a spoken address recognition/connection system of the alternate network configuration.

FIG. 7 is a flow diagram of recognition and extraction from previously recorded messages in a spoken address recognition/connection system of the alternate network configuration. A user retrieves voice mail messages in block 702. Upon detecting desired address information in block 704, the user activates the voice recognition system, block 706. The voice recognition system scans or evaluates the message and identifies portions of the message possible containing address information, block 708. In block 710, these message portions are replayed for the user so that the user can confirm the presence of desired address information. When the user confirms the presence of address information in a message portion in block 712, the identified address information is automatically recognized and extracted in block 308. The extracted address information is formatted under block 310 in a pre-specified form as described herein. The formatted address information is available to the user at any time. In one embodiment, the address information is stored at a user-selected location for later retrieval by the user under block 312. The address information is subsequently available for use in automatically coupling the user's communication device to electronic devices accessed by or associated with the extracted address information.

The spoken address recognition/connection system provides numerous alternatives for providing a user with access to the extracted address information. These alternatives may be used separately, or in any combination.

In one alternative, and with reference to FIG. 1, the voice mail system sends the extracted address information in a message to the user's phone using a short message via message transfer systems 120 and/or wireless networks 116 in a similar manner to that typically used for sending callback numbers to the phone that were entered using DTMF tones. For example, the Short Message Service can be used to transfer the message. The address information is extracted from the short message by the phone, edited, and stored locally for later use in establishing communications by the user.

Alternatively, the recognition/connection system 102 may forward the address information to the pager network 118. The pager network 118 then in turn forwards the address information to the user's pager. The user may then retrieve or view the address information and establish a connection (e.g., read the number from a display on an alphanumeric pager and dial the number into a cell phone or enter a URI on a wireless PDA having a web connection and browser).

In the case where the address information is a call-back telephone number, the address information is transferred to a telephone switch associated with the voice mail system. The telephone switch disconnects the user from the voice mail system and couples the user instead to the device associated with the extracted telephone number.

As yet another alternative, and with reference to FIG. 1, the voice mail system transfers the address to servers 122 using a datagram. The datagram, or other transfer message type, includes both the recognized address information and the user's address, as well as any security information needed to allow for posting of the transfer message. The servers 122 include, but are not limited to, address books in mail servers or mail boxes, or personal and/or corporate servers including associated databases or webpages. The server might be, for example, part of a system that provides the user with web portal service. The web portal service allows the user to retrieve and edit the address information, and load it into a network or personal directory on the associated server. The address information can then be synchronized with a directory on the phone in a typical manner.

Alternatively, the recognition/connection system 102 may forward the address information to be posted to a personal or corporate web page associated with the user. The user may then access the web page (including entering any necessary passwords, etc.) to retrieve the address information via, e.g., WAP enabled mobile phone, wireless PDA, etc.

As noted above, recognition/connection system uses voice recognition techniques known in the art. Alternate embodiments can use pattern recognition and prompts to improve system performance. For example, the system may parse through a live or recorded audio stream for select spoken phrases, such as: "my number is", "call me at", "leave me a message at", "my email address is", "to call [name] at", "send a message to", and similar phrases or constructions using similar terms. Using pattern recognition, for example, a number pattern can be specified for searching following recognition of the Country Code. Regarding electronic mail addresses and URIs, patterns can be specified for search based on detecting the spoken words: "dot", "at", "http/ftp", "colon", "slash", "WWW", "XXX", "com", "org", and "gov".

Prompts can also be used to increase the efficiency and accuracy of the voice recognition. For example, the voice mail system might prompt a caller to leave callback number information at a particular time, thereby eliminating the need to analyze the entire voice mail message. As an example, the system can prompt the caller to leave a callback number at the beginning or end of the message.

FIGS. 1, 5, and 6 and the following discussion provide a brief, general description of a suitable computing environment in which aspects of the invention can be implemented. Although not required, embodiments of the invention are described herein in the general context of computer-executable instructions, such as routines executed by a general purpose computer (e.g., a server, personal computer, or processor-based device). Those skilled in the relevant art will appreciate that aspects of the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. Aspects of the invention can be embodied in a special purpose computer or data processor that is specifically programmed, configured or constructed to perform one or more of the computer-executable instructions explained in detail herein. Indeed, the term "computer," as used generally herein, refers to any of the above devices, as well as any data processor.

Aspects of the invention can also be practiced in distributed computing environments where certain tasks or modules are performed by remote processing devices and which are linked through a communications network, such as a Local Area Network ("LAN"), Wide Area Network ("WAN") or the Internet. In a distributed computing environment, program modules or sub-routines may be located in both local and remote memory storage devices. Aspects of the invention described herein may be stored or distributed on computer-readable media, including magnetic and optically readable and removable computer disks, hard-wired or preprogrammed in chips (e.g., EEPROM semiconductor chips), as well as distributed electronically over the Internet or over other networks (including wireless networks). Those skilled in the relevant art will recognize that portions of the invention reside on a server computer, while corresponding portions reside on a client computer. Data structures and transmission of data particular to aspects of the invention are also encompassed within the scope of the invention. In general, while hardware platforms, such as the personal computer and remote computer, are described herein, aspects of the invention are equally applicable to nodes on a network having corresponding resource locators to identify such nodes.

Referring to the flowchart of FIG. 2 (and the others described herein), each of the functions depicted is of a type either well known in the art or capable of being implemented based on the detailed description provided herein. Each depicted function or block can itself include a sequence of operations that need not be described herein. Those skilled in the relevant art can create source code, microcode, program logic arrays or otherwise implement aspects of the invention based on the flowcharts and the detailed description provided herein. The routines may be stored in non-volatile memory (not shown) that forms part of an associated processor, or can be stored in removable media, such as disks, or hardwired or preprogrammed in chips, such as EEPROM semiconductor chips. Alternatively, such routines can be stored on any suitable computer-readable medium, such as software stored on a computer-readable disk, or downloaded from a server and stored locally at a client.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "above", "below," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other voice information systems, not only for the spoken address recognition/connection system.

The elements and acts of the various embodiments described above can be combined to provide further embodiments. Any references and U.S. patents and applications provided herein are incorporated herein by reference. Aspects of the invention can be modified, if necessary, to employ the systems, functions and concepts of any patents and applications described herein to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

What I claim is:

1. A method for automatically connecting to electronic addresses received in spoken communications, comprising:
   receiving at least one telephone call from a caller, wherein the at least one telephone call includes voiced address information, wherein the voiced address information corresponds to at least one electronic address;
   automatically identifying the voiced address information while the telephone call is ongoing, wherein the identifying is performed without first actively soliciting the caller for the at least one electronic address, without activating a voice record function on the phone, and without need for querying a database for the at least one electronic address previously existing within the database;
   automatically extracting the identified voiced address information based on the identified voiced address information;
   receiving user input;
   after receiving the user input, automatically coupling to at least one electronic address associated with the voiced address information based in part on the automatically extracted and identified voiced address information, wherein the coupling comprises:
   generating an electronic message including the extracted voiced address information;
   forwarding the electronic message among at least one location pre-specified by a user; and
   extracting the voiced address information from the electronic message following receipt at the at least one location.

2. The method of claim 1, wherein the at least one location includes a telephone, wherein at least one operation can be performed on the address information including editing and storing.

3. The method of claim 1, wherein the at least one location includes at least one call switch, wherein a first electronic connection is terminated in order to establish the coupling.

4. The method of claim 1, wherein the at least one location includes at least one server, wherein at least one operation can be performed on the address information including editing, loading into at least one directory, and posting to at least one web page.

5. The method of claim 1, further comprising receiving at least one command from a user, wherein the at least one command is of a type selected from among spoken commands and manual input commands.

6. The method of claim 1, wherein the electronic address types further include electronic mail addresses and Uniform Resource Identifiers.

7. The method of claim 1, wherein coupling comprises connecting a called party with two or more other parties during a telephone call using the at least one electronic address, wherein a conference call is established.

8. The method of claim 1, wherein the at least one electronic address is associated with at least one device selected from among personal computers, processor-based devices, wired telephones, wireless telephones, wired radiotelephones, wireless radiotelephones, Internet telephones, cellular telephones, pagers, personal digital assistants, personal communication devices, electronic mail devices, telematic systems, and infomatic systems.

9. A method for automatically connecting to electronic addresses in voice streams, comprising:
   receiving electronic communications including the voice streams,
   automatically recognizing and extracting the electronic addresses from the received voice streams using automatic voice recognition during normal reception of the voice stream and not under a special mode and without activating a voice record function, wherein the electronic addresses include telephone numbers and either email addresses or a Uniform Resource Identifiers, and wherein the voice streams are continuous, as opposed to discrete, streams of voice information provided under live telephone calls, and
   automatically connecting two or more electronic communication devices using the electronic addresses, wherein the automatically recognizing is performed at neither of the two electronic communication devices.

10. A communications system, comprising:
at least one network coupled among components including:
at least one portable communications device;
at least one routing system;
at least one voice message system; and
at least one recognition and connection system;
wherein the components support voice recognition analysis on live calls and recorded information, wherein the voice recognition analysis includes:
analyzing at least one voice stream,
automatically identifying spoken address information of the at least one voice stream without activating a voice record function, wherein the spoken address information includes at least one electronic address selected from electronic address types including telephone numbers, wherein the identifying is performed without first actively soliciting a caller for the at least one electronic address, and without need for querying a database for the at least one electronic address previously existing within the database,
automatically recognizing and extracting the identified address information,
transferring the extracted address information to at least one pre-specified location, and
automatically connecting users to the at least one electronic address using the extracted address information in response to a command.

11. The system of claim 10, wherein users select configurations from among configurations including automatic and manual configurations, wherein at least one automatic configuration automatically retrieves and scans the at least one voice mail message, wherein at least one manual configuration retrieves and scans the at least one voice mail message upon receipt of at least one corresponding user command.

12. The system of claim 10, wherein transferring includes using at least one short message transfer type selected from among short message services and alphanumeric paging services.

13. A portable telephone system that automatically couples to electronic addresses received in audio communications, comprising at least one voice recognition subsystem configurable to:
analyze received substantially continuous verbal data;
automatically identify spoken address information in real time among the substantially continuous verbal data without the need to activate a voice record function, wherein the spoken address information includes at least one electronic address selected from electronic address types including telephone numbers, wherein the identifying is performed without need for querying a database for the at least one electronic address previously existing within the database, or querying a database for an identify of a caller;
automatically recognize and extract the identified spoken address information;
format the extracted address information;
transfer the formatted address information to at least one pre-specified location; and
couple to the at least one electronic address using the transferred address information.

14. The system of claim 13, wherein the transfer includes using at least one short message transfer type selected from among short message services and alphanumeric paging services to transfer the extracted address information to a user's portable telephone.

15. A portable electronic device that automatically couples users among electronic addresses received in spoken communications, comprising
at least one recognition system that performs background or passive voice recognition analysis on continuous streams of live calls and recorded information, wherein the voice recognition analysis includes analyzing voice streams, automatically identifying address information of the voice streams without activating a voice record function on the portable electronic device, wherein the address information includes electronic addresses selected from electronic address types including telephone numbers and either email addresses or Uniform Resource Identifiers, automatically recognizing and extracting the identified address information, and transferring the extracted address information to at least one pre-specified location, and
at least one connection system that couples to the electronic addresses using the extracted address information in response to user commands.

16. The device of claim 15, wherein transferring includes using at least one short message transfer type selected from among short message services and alphanumeric paging services to transfer the extracted address information to a user's portable communication device.

17. A computer readable medium including executable instructions which, when executed in a processing system, automatically couples to electronic addresses received in spoken communications by:
receiving at least one telephone call including voiced address information, wherein the voiced address information corresponds to at least one electronic address;
automatically identifying the voiced address information while the telephone call is ongoing without activating a voice record function, wherein the identifying is performed without first querying the caller for the at least one electronic address, and without need for querying a database for the at least one electronic address previously existing within the database;
automatically extracting the identified voiced address information based on the identified voiced address information;
receiving user input; and
after receiving the user input, automatically coupling to at least one electronic address associated with the voiced address information based in part on the automatically extracted and identified voiced address information, wherein the coupling comprises:
generating an electronic message including the extracted voiced address information;
forwarding the electronic message among at least one location pre-specified by a user; and
extracting the voiced address information from the electronic message following receipt at the at least one location.

* * * * *